Patented May 11, 1948

2,441,534

UNITED STATES PATENT OFFICE 2,441,534

ABRASIVE MATERIALS AND METHOD OF MANUFACTURING THE SAME

Charles L. Norton, Jr., New York, N. Y., assignor to The Babcock & Wilcox Company, Newark, N. J., a corporation of New Jersey No Drawing. Application January 24, 1940, Serial No. 315,398

15 Claims. (Cl. 51—308)

The present invention relates to improvements in abrasive materials and methods of manufacturing the same.

Abrasives now in commercial use consist of natural or synthetically formed small abrasive particles or crystal fragments which are used either as a finely divided powder formed into a paste or a slurry, or bonded with a suitable separately formed binder and molded into the form of a wheel or block. In either case the cutting action mainly depends upon the size and relative hardness of the abrasive particles. The effectiveness of the abrasives used with a binder is also affected by the character of the binder in which the abrasive particles are embedded. In the manufacture of silicon carbide grinding wheels, for example, abrasive silicon carbide grains are mixed with a suitable binder or matrix-forming material and molded into the desired shape for curing or firing. The binder or matrix-forming materials are carefully selected for their adhesive and hardness properties when cured or fired to permit the abrasive particles to be held in position and yet continually present new grinding points to the surface being treated.

For fine grinding operations, such as the polishing of optical or plate glass, a powdered abrasive is normally used in the form of a paste or a slurry. Such abrasives are mainly judged as to commercial value by the quality of the polished surface obtainable and the time required to obtain such a polished surface. Other important characteristics to be considered are the ease in which the abrasive material can be cleaned from the work, the machine, and the operator's person; its irritating or toxic effect on the operator; its rate of settling out when in a water suspension; and the length of its useful life.

Rouge and rouge mixtures have long been recognized and used commercially as the most suitable abrasive materials for this class of work, notwithstanding the extremely high cost of the same even in large quantities, their disfiguring color, and tendency to adhere to the surface on which they are used or to any article with which they come into contact.

The main object of my invention is the provision of an improved method of manufacturing abrasive materials which is particularly characterized by its adaptability for the production of a wide range of abrasives ranging from abrasives adapted for rough grinding to abrasives capable of being used as a substitute for rouge in any of the present abrasive uses of that material, with equal and usually superior results. A more specific object is the provision of a manufacturing method of the character described which results in the production of essentially uniformly sized abrasive crystals embedded in a matrix and in which the size of the abrasive particles and character of the matrix can be readily controlled in accordance with the intended use of the material. A further object is the provision of abrasive materials which are relatively cheap, white, non-toxic and non-staining, easy to remove from the surface treated or from any article with which they contact, and highly effective for their intended purposes.

The various features of novelty which characterize my invention are pointed out with particularity in the claims annexed to and forming a part of this specification. For a better understanding of the invention, its operating advantages and specific objects attained by its use, reference should be had to the accompanying descriptive matter in which I have described various embodiments of my invention.

In carrying out my invention, I employ an alumina-silica base material, preferably a naturally occurring relatively pure alumina-silica mineral having a relatively high content of alumina ($Al_2O_3$), and heat treat the same with or without additional material, depending upon the desired form of abrasive, to synthetically produce a multitude of small substantially uniformly sized abrasive crystals embedded in a suitable matrix which bonds the crystals into a homogeneous mass. Under the action of heat, crystals of aluminum silicate (mullite) slowly form in the mass and while at first the crystals are too small to be seen by a microscope, as the temperature and duration of heating is increased, the crystals increase in size and can be readily seen under a microscope. The remaining material of the mass forms into an amorphous non-crystalline matrix in which the mullite crystals are embedded.

The mullite crystals begin to form at a temperature about 1850° F. The crystals increase in size relatively slowly until the "maturing range" of temperatures is reached, in which band of temperatures little, if any, change in crystal size occurs. At temperatures above the maturing range, depending upon the composition of the material, the crystals tend to increase in size more rapidly. This condition is believed to be due to changes in the character of the glassy matrix which controls to some extent the rate of growth of the crystals. When the material is calcined to this condition, the crystal size is considered unsatisfactory for a glass polishing material as scratching tends to occur with the larger size crystals. Since the size of the crystals formed on recrystallization is mainly dependent upon the temperature to which the material is heated and duration of the heating period, the size of the crystals can be readily controlled by regulating the heating effect. In all cases, the matrix should be below the hardness of the crystals and preferably close to the hardness of the surface to be treated. The matrix formed is usually composed largely of silica which forms a matrix of a definite hardness.

The extent of the "maturing range" of temperatures is particularly important in the manufacturing operation, and the broader the range, the greater the permissible latitude in the calcining operation without change in the uniformity of the product. I have found that the maturing range can be substantially broadened by the inclusion of a fluxing material, preferably a suitable glass-forming material, in the material to be calcined to aid the formation of the mullite crystals. Predetermined amounts of a suitable glass-forming material, such as soda, lime, borax or lead, can be introduced before the described calcination to combine with the normally occurring silica matrix to vary the character thereof, and particularly its hardness and viscosity.

The basic material employed in addition to its high alumina content, which is preferably above 40% for producing a rapid cutting abrasive, should produce a high percentage of uniformly sized microscopic crystals on recrystallization, and be relatively free of impurities such as particles of iron, silica, quartz, and other abrasive constituents. I have found that the Southern kaolins are particularly satisfactory for the basic material. Kaolin is a very pure clay and often occurs containing little free grit and few impurities and an alumina content of approximately 46%. Under the action of heat kaolin breaks up and recrystallizes into a multiplicity of microscopic mullite crystals in a matrix, the chemical action being:

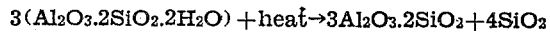
$$3(Al_2O_3.2SiO_2.2H_2O) + heat \rightarrow 3Al_2O_3.2SiO_2 + 4SiO_2$$

Mullite has a hardness of about 7.5 on the Moh hardness scale. The kaolin was made up for calcining by wetting the material to a dry pressing consistency and then molding into slugs. The slugs were dried before firing. The slugs were heated in a periodic kiln up to the maximum desired temperature in from 3-4 hours, held at the maximum temperature for 2½–3½ hours, and then slowly cooled.

While kaolins heat treated as described and subsequently crushed and milled to the desired fineness are highly abrasive, they have been found unsuitable for the finest grinding and polishing operations, such as glass polishing, for which rouge is now employed commercially, except when the maximum calcining temperature is in a relatively narrow maturing range around 2200° F. The described calcination of kaolin produces a uniform structure which contains approximately 65% mullite crystals of uniform size embedded in a homogeneous matrix. In view of the enormous quantities of suitable kaolins available at a relatively low cost, it forms an ideal raw material for my purpose.

The calcined material is crushed and milled to a predetermined degree of fineness, depending upon its intended use. The exact sizing of the material is not of vital importance for ordinary grinding operations, since the size of the individual mullite cutting points will be substantially the same regardless of the crushed particle size. For glass polishing operations, however, all of the abrasive particles should preferably be below ten microns, and most of them below six microns in size. A single particle of my material of a size suitable for polishing plate glass may contain from ten to one hundred cutting points bonded together; whereas, with the loose crystalline abrasives heretofore known, any variations in abrasive particle size will affect the abrading characteristic, since such particles are single crystals or fragments of crystals and the size of the cutting point is proportional to the size of the fragment. In any case the milled material should pass through a two hundred mesh screen.

Except when calcined to a temperature in the relatively narrow maturing range stated, calcined kaolins are only a fair grade of abrasive. When calcined to temperatures below the maturing range, they are relatively slow cutting, and when calcined to temperatures above the range, they make light scratches on the surface treated. I have found that when pulverized raw kaolin is first mixed with relatively pure plaster of Paris or lime in a finely divided condition and the mixture heat treated in a predetermined manner, the resulting product is a higher grade abrasive. The plaster of Paris or lime appears to act as a flux lowering the temperature at which recrystallization begins and considerably widening the maturing range. Lime-kaolin and plaster of Paris-kaolin mixtures can be calcined to maximum temperatures in a maturing range of 1900° F.-2450° F. and obtain substantially identical end products, although the best results were obtained in periodic kilns in the range 2150° F.-2350° F. The fluxing material also appears to facilitate the absorption of impurities in the clay to form a particularly suitable matrix for the mullite crystals. Other glass-forming ingredients, such as borax, bottle glass, feldspar, lead oxide, sodium carbonate, etc., could probably be substituted for the lime or plaster of Paris and obtain substantially the same result. It is also possible to eliminate such impurities from the raw kaolin by other types of purifying apparatus, such as a settling and decantation operation, but such operations would substantially increase the cost of manufacture of the end product.

One mixture of materials which I have found particularly suitable for producing a high grade abrasive suitable for polishing glass consisted of the following:

| | Parts by weight |
|---|---|
| Plaster of Paris (99% pure calcium sulphate) | 37 |
| Wood sawdust (4–8 mesh) | 37 |
| Pulverized Georgia kaolin | 100 |

These dry materials were intimately mixed in a container and then blended with an amount of water about equal in weight to the weight of the dry materials. The material was then molded into suitable shapes for handling and allowed to set for a sufficient period to permit at least partial recrystallization of the plaster of Paris. The shapes were then fired while still wet, no intermediate drying being necessary. The shapes were fired by introducing them into a tunnel kiln having an initial temperature of 1200° F. and a non-oxidizing atmosphere. The kiln temperature was gradually increased to about 1700° F., during which period the combustible particles are believed to be completely distilled and carbonized. The kiln temperature was then gradually increased to about 2350° F., with the non-oxidizing atmosphere replaced by an oxidizing atmosphere to completely eliminate the carbon particles. The firing period in the tunnel kiln exclusive of the cooling zone totaled about four and one-quarter hours. The resulting product was a light weight refractory having approximately 70% voids by volume. The refractory shapes were then crushed and ball milled until all of the material was below ten microns and substantially all below six microns.

For test purposes the milled material was made into a slurry having a concentration of 31–41% solids and circulated over a lapping wheel having a felt disc. Plate glass specimens having a rough ground surface were then polished on the wheel. Each treated glass surface received a highly polished optical finish throughout its extent within ten minutes, and was free from objectionable scratches, ripples, pits or grooves.

A more dense mixture found equally suitable for producing a glass polishing material consisted of the following:

| | Parts by weight |
|---|---|
| Pulverized Georgia kaolin | 100 |
| Unslaked lime | 14.4 |

The lime was slaked with water at room temperature and made into a paste. The remaining water required was then added at 150° F. and the clay mixed in. The mix was then molded and the molded slugs dried at 200° F. until about 30% of the water used in molding still remained. The slugs were fired in a periodic kiln on a firing schedule in which the kiln maximum temperature was reached in 3–4 hours and the slugs soaked at that temperature from 2½–3½ hours. Slugs burned to maximum temperatures ranging from 2000° F.–2400° F. when crushed and milled to the desired size were found satisfactory for glass polishing, with the products of the burns at 2200° F. and 2300° F. particularly producing excellent polished surfaces.

Each of the described abrasives is believed to consist of a multiplicity of uniformly sized microscopic mullite crystals embedded in a glassy matrix of such a character that it does not of itself cause scratching due to its own hardness, and yet binds the individual mullite crystals in such a way that the crystals will pull out of the individual grains rapidly after they become dulled and continually expose new cutting shapes to the surface being treated.

The experimental results obtained with the described abrasives indicate a capacity for polishing glass in approximately one-third the time now required with glass polishing abrasives in commercial use and equal to that of the best polishing abrasives available. The low cost of raw materials, firing cycle, and pulverizing operations employed in the described mode of manufacture all contribute to the production of a relatively cheap abrasive even for the finer polishing operations. The ease in which the manufacturing operations can be controlled as to crystal size and character of matrix affords an effective method of producing suitable abrasives for a wide range of abrading operations and materials. The presence of uniformly sized microscopic abrading particles in my abrasive is of prime importance in effecting the uniform abrading action by which it is particularly characterized. My improved abrasive material can be readily employed in most, if not all, of the abrasive polishing compounds now in use for glass, metallic and lacquered surfaces by merely substituting it for the abrasive materials previously in use. Its white color and non-staining characteristics permit its use on a wider range of materials and articles than most of the high grade abrasives now in use. No difficulty has been found in rapidly washing the abrasive off the treated surface or in removing it from other surfaces with which it contacts. The improved abrasives do not settle out of suspension as readily as commercial rouge compounds, and can also be used in higher concentrations. The material is non-toxic and non-irritating to the operator. No noticeable slowing down of the polishing action of the material occurred in a test run of several hours for that purpose.

While in accordance with the provisions of the statutes I have disclosed the best embodiment of my invention now known to me, those skilled in the art will understand that variations may be made in the materials and method of manufacture employed without departing from the spirit of the invention covered by my claims, and that certain features of my invention may sometimes be used to advantage without a corresponding use of other features. While I have specifically described the abrasive-manufacturing method of my invention with alumina-silica base materials, I also contemplate the heat treatment of other compounds as base materials to cause the same recrystallizing action resulting in a uniform dispersion of crystals of substantially the same size in a suitable matrix. I also contemplate the production of similar products by the concentration of crystal-forming solutions to a point where minute uniformly dispersed crystals will be obtained in a suitable matrix.

This application is a continuation-in-part of my prior application, Serial No. 255,856, filed February 11, 1939, now abandoned.

I claim:
1. The method of manufacturing an abrasive material which comprises heat treating at a temperature below its fusion temperature a base material capable of crystallization at a temperature below its fusion temperature until a preponderance of microscopic abrasive crystals are formed in a matrix, and reducing the material so treated to a finely divided condition.

2. The method of manufacturing an abrasive material which comprises calcining an alumina-silica base material at a temperature below its fusion temperature until recrystallization has progressed sufficiently to form a multiplicity of microscopic mullite crystals embedded in a matrix, and reducing the calcined material to a finely divided condition.

3. The method of manufacturing an abrasive polishing material which comprises calcining a mixture of a relatively pure naturally occurring alumina-silica mineral having a high alumina content and a fluxing material capable of lowering the mullite crystallization temperature, up to a maximum temperature between the mullite formation temperature and the fusion temperature of the alumina-silica mineral, and reducing the calcined material to a finely divided condition.

4. The method of manufacturing an abrasive polishing material suitable for glass polishing which comprises mixing a relatively pure raw kaolin with a predetermined amount of a glass-forming agent, calcining the mixture at a temperature below its fusion temperature until recrystallization has progressed sufficiently to form a multiplicity of microscopic abrasive crystals embedded in a glassy matrix, and reducing the calcined mixture to a finely divided condition.

5. The method of manufacturing an abrasive polishing material suitable for glass polishing which comprises mixing a relatively pure raw kaolin having a high alumina content with a predetermined amount of plaster of Paris, calcining the mixture until recrystallization has progressed sufficiently to form a multiplicity of microscopic mullite crystals embedded in a glassy matrix, and reducing the calcined mixture to a finely divided condition.

6. The method of manufacturing an abrasive polishing material suitable for glass polishing which comprises mixing a relatively pure raw kaolin having a high alumina content with a predetermined amount of a glass-forming agent, calcining the mixture in the temperature range between 1900° and 2500° F. until recrystallization has progressed sufficiently to form a multiplicity of microscopic mullite crystals embedded in a matrix, and reducing the calcined mixture to a finely divided condition.

7. As a new article of manufacture, a non-staining abrasive material having finely divided particles each consisting of a homogeneous unfused mass of microscopic abrasive crystals embedded in a matrix of relatively lower hardness.

8. As a new article of manufacture, a non-staining abrasive polishing material having finely divided particles each consisting of a homogeneous unfused mass of uniformly sized microscopic mullite crystals embedded in a glassy matrix of relatively lower hardness.

9. As a new article of manufacture, an abrasive glass polishing material having a preponderance of microscopic mullite crystals embedded in a matrix of relatively lower hardness.

10. As a new article of manufacture, a finely divided non-staining non-toxic polishing material containing a preponderance of microscopic mullite crystals and having glass polishing properties equivalent to and a lower density than rouge.

11. An abrasive material comprising a finely divided alumina-silica base material calcined at a temperature below its fusion temperature until recrystallization has progressed sufficiently to form a multiplicity of microscopic mullite crystals embedded in a glassy matrix.

12. As a new article of manufacture, a finely divided abrasive material formed by reducing the product of a mixture containing an alumina-silica base material and a glass-forming agent heated to a maximum temperature within the mullite maturing range.

13. As a new article of manufacture, a finely divided glass polishing material formed from a mixture of raw kaolin and a glass-forming agent calcined to a maximum temperature within the range of 1900° F.–2500° F.

14. As a new article of manufacture, a finely divided glass polishing material formed by reducing a relatively pure raw kaolin having a high alumina content calcined to a maximum temperature of approximately 2200° F.

15. A polishing material comprising a fine-grained, non-toxic, non-staining material of a physical state that will polish glass, resulting from the heat treatment of a batch of substantially pure kaolin clay at a temperature and for a time interval sufficient to heat the individual particles of clay to a temperature below the clay fusion temperature until recrystallization has progressed sufficiently to form a multiplicity of microscopic mullite crystals embedded in a glassy matrix.

CHARLES L. NORTON, Jr.

REFERENCES CITED

The following references are of record in the file of this patent:

UNITED STATES PATENTS

| Number | Name | Date |
|---|---|---|
| 1,524,134 | Hutchins | Jan. 27, 1925 |
| 1,631,695 | Riddle | June 7, 1927 |
| 1,682,250 | Riddle | Aug. 28, 1928 |
| 1,712,005 | Lambie et al. | May 7, 1929 |
| 1,806,414 | Patten | May 19, 1931 |
| 1,836,448 | Colt | Dec. 15, 1931 |
| 1,951,233 | Binkley | Mar. 13, 1934 |
| 1,966,407 | Hauman | July 10, 1934 |
| 1,980,432 | Power | Nov. 13, 1934 |
| 2,046,764 | Benner et al. | July 7, 1936 |
| 2,115,197 | Edwards | Apr. 26, 1938 |
| 2,256,528 | Rowe et al. | Sept. 23, 1941 |

OTHER REFERENCES

Chemical and Metallurgical Engineering, vol. 35, No. 2, February 1928, pages 86 to 88, "Mullite Refractories Extend Field of High Temperature Processes," by W. A. Koehler. (Copy in Div. 38.)